Aug. 19, 1947.        H. R. FREUND        2,426,146
APPARATUS FOR PRODUCING JUSTIFIED TYPE MATTER
Filed July 9, 1946        6 Sheets-Sheet 1
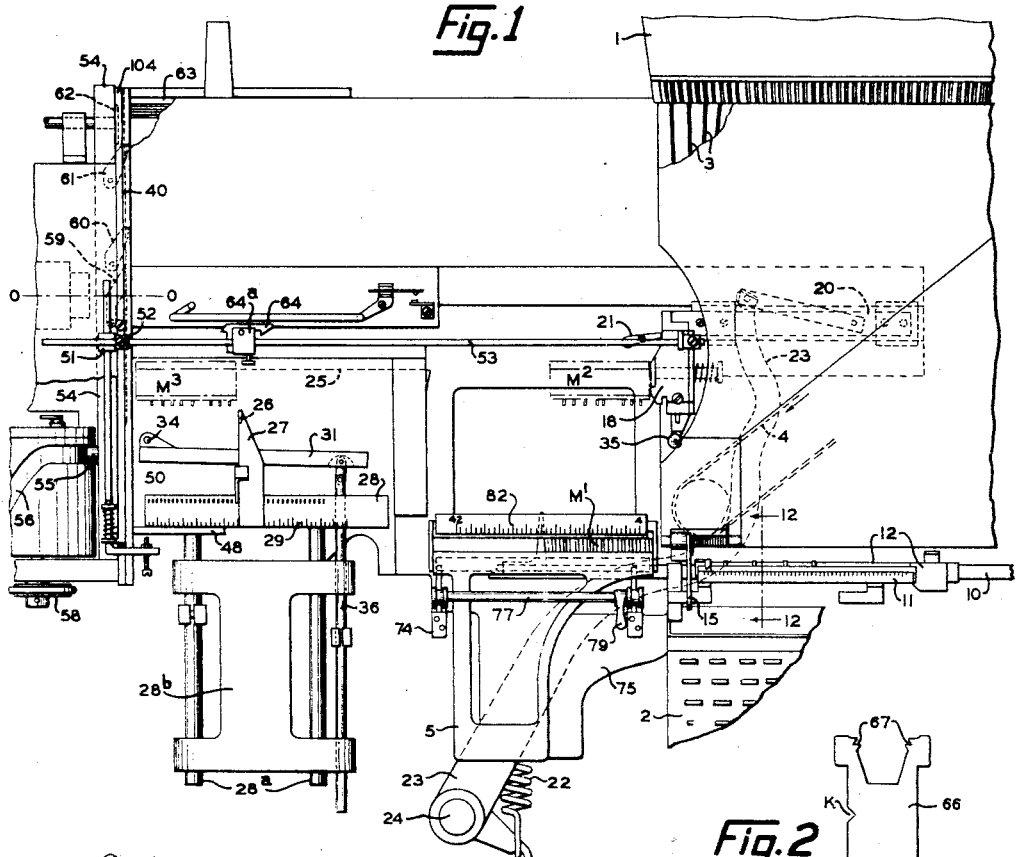
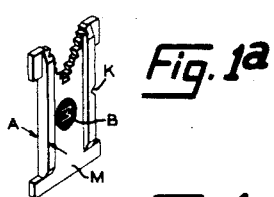
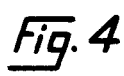
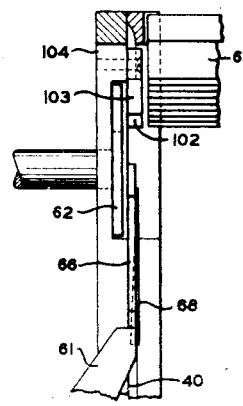
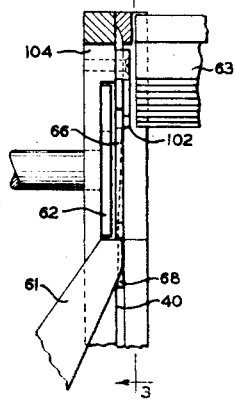
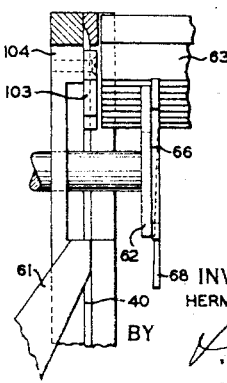
INVENTOR
HERMAN R. FREUND
BY
ATTORNEY

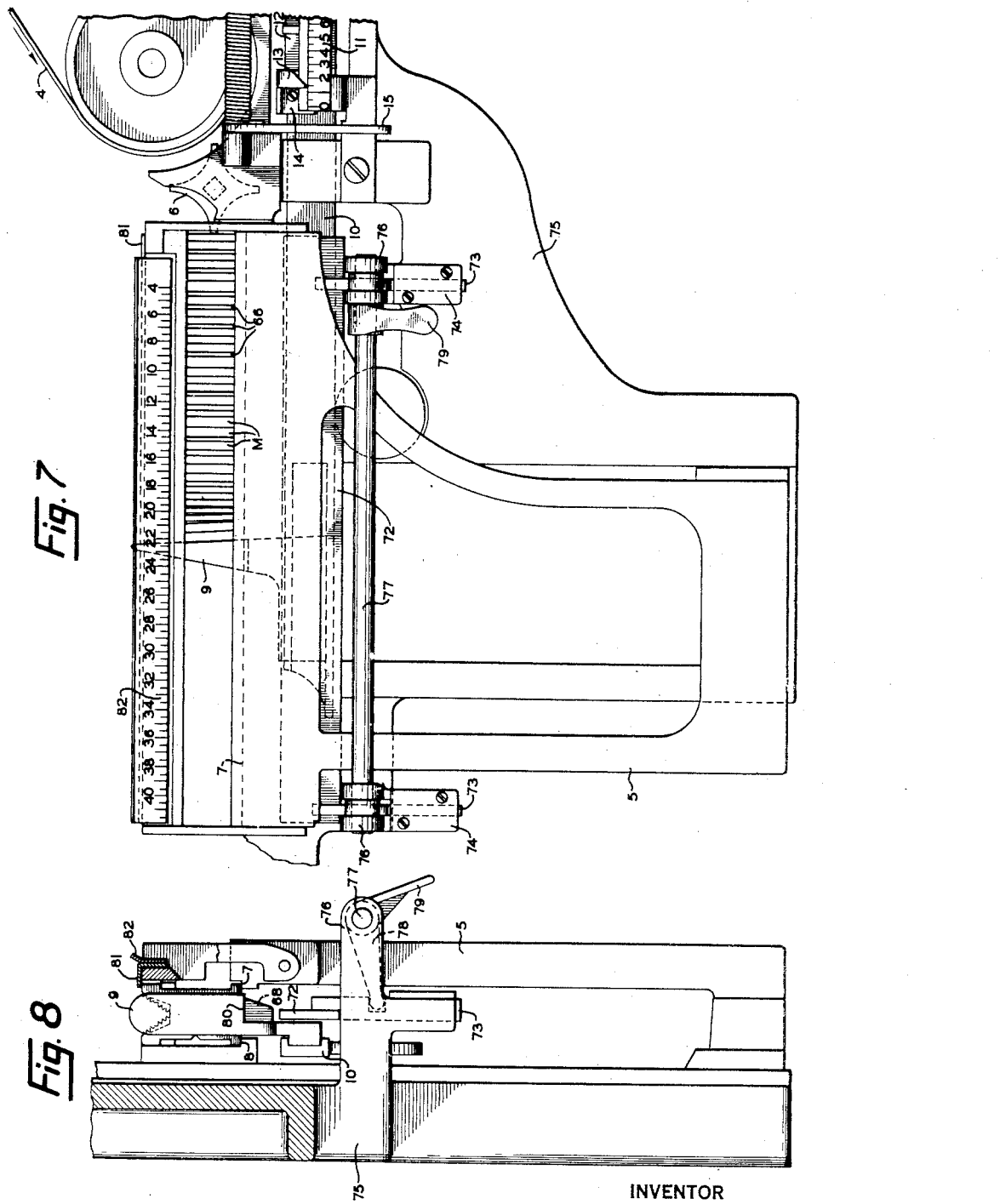

Aug. 19, 1947.   H. R. FREUND   2,426,146
APPARATUS FOR PRODUCING JUSTIFIED TYPE MATTER
Filed July 9, 1946   6 Sheets-Sheet 3

INVENTOR
HERMAN R. FREUND
BY
ATTORNEY

Aug. 19, 1947.        H. R. FREUND        2,426,146
APPARATUS FOR PRODUCING JUSTIFIED TYPE MATTER
Filed July 9, 1946          6 Sheets-Sheet 4
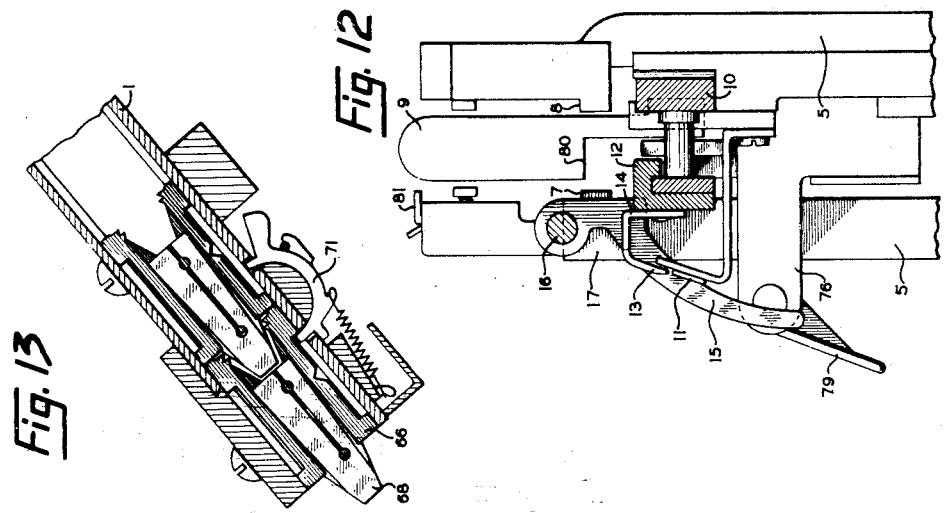
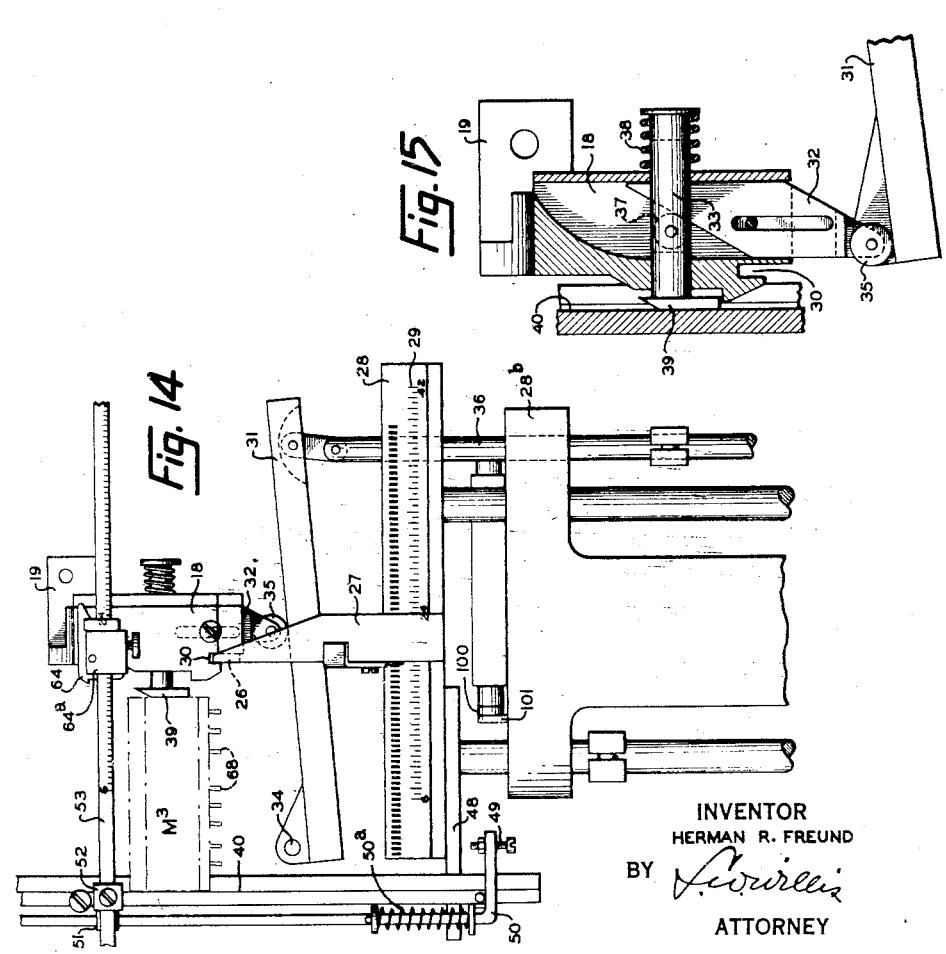
INVENTOR
HERMAN R. FREUND
BY
ATTORNEY

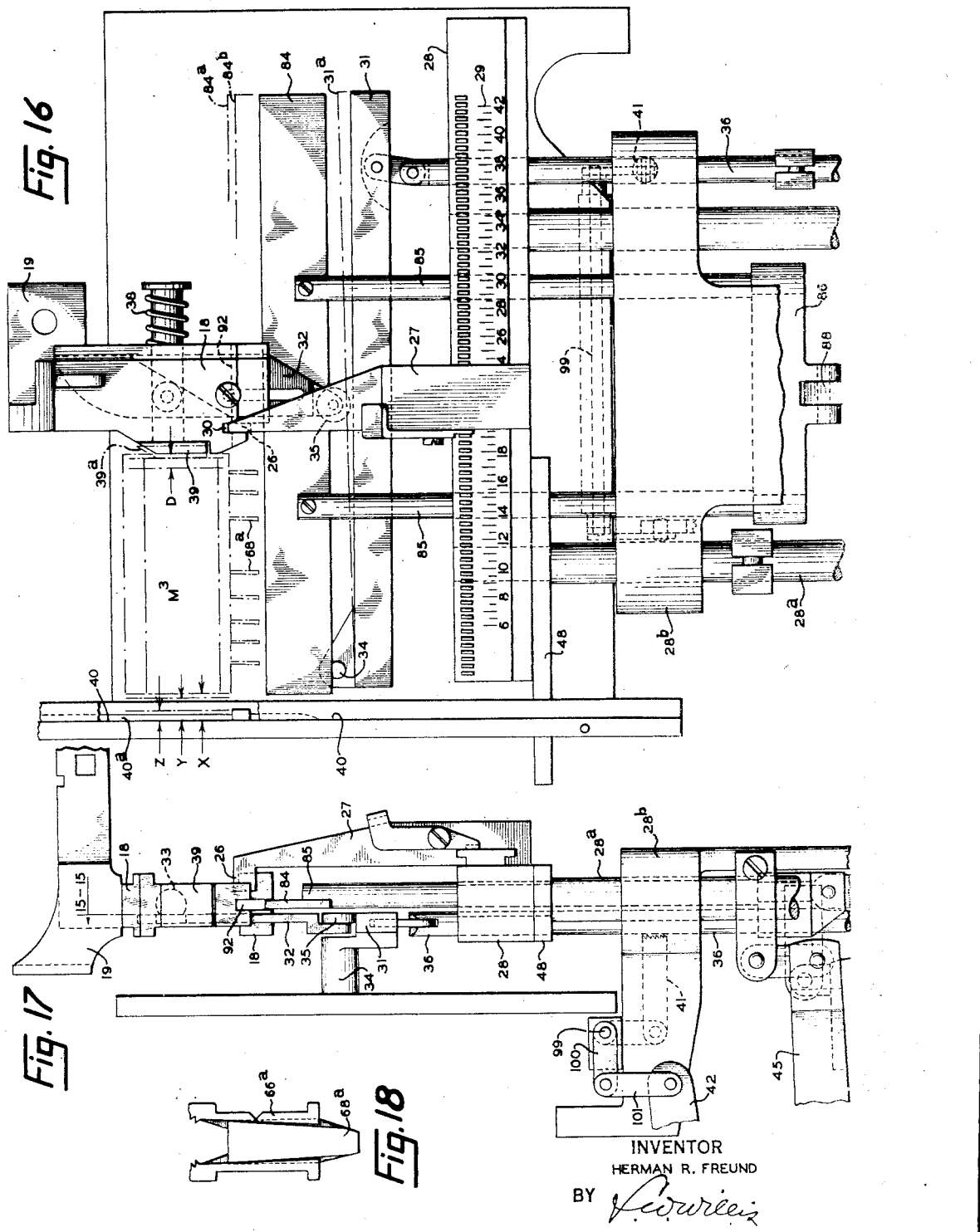

Aug. 19, 1947.  H. R. FREUND  2,426,146
APPARATUS FOR PRODUCING JUSTIFIED TYPE MATTER
Filed July 9, 1946  6 Sheets-Sheet 6
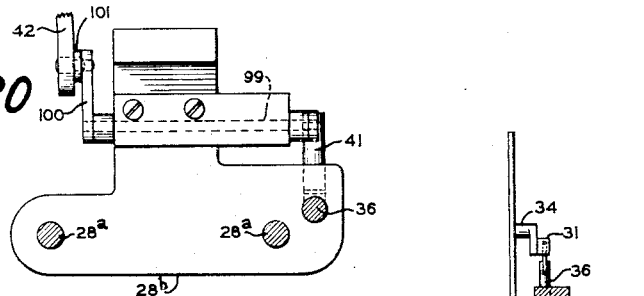
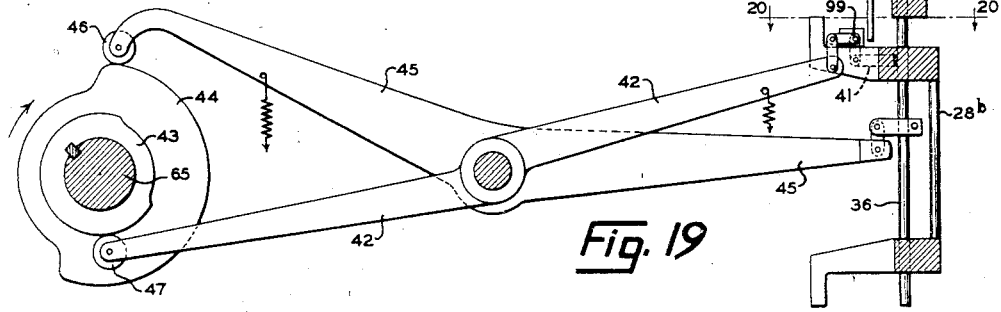
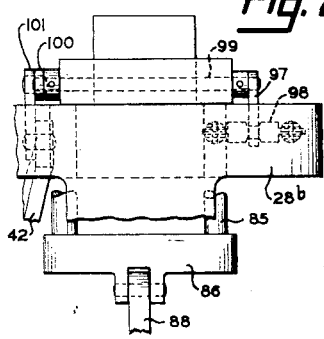
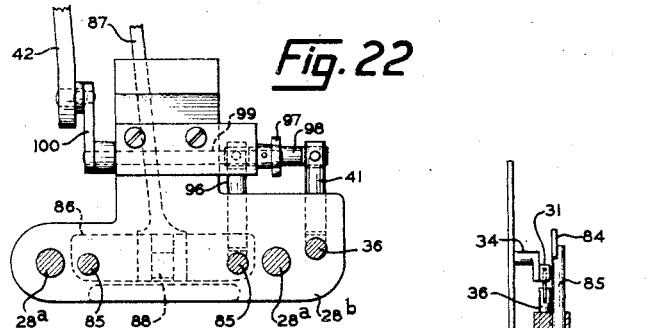
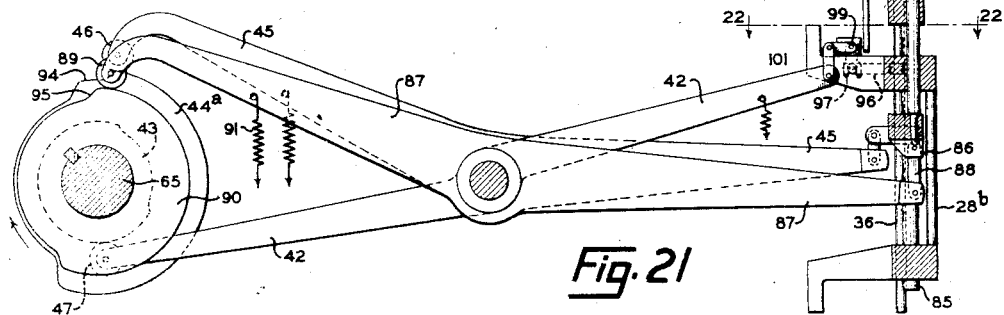
INVENTOR
HERMAN R. FREUND
BY
ATTORNEY Patented Aug. 19, 1947

2,426,146

UNITED STATES PATENT OFFICE 2,426,146

APPARATUS FOR PRODUCING JUSTIFIED TYPE MATTER

Herman R. Freund, Brooklyn, N. Y., assignor to Intertype Corporation, Brooklyn, N. Y., a corporation of New York Application July 9, 1946, Serial No. 682,233

23 Claims. (Cl. 95—4.5)

This invention relates to typographical line-composing machines in general and is especially adapted for and useful in connection with machines of the general organization disclosed in Letters Patent No. 2,395,659, granted February 26, 1946, of which I am co-inventor and which are arranged to produce lines of type matter photographically. The invention is directed specifically to improved method and apparatus for producing justified lines of type matter in such machines.

In the machine disclosed in the aforesaid patent the photographically produced line is made by exposing individually the type characters borne or represented by elements composed into a line of random length, usually less than the desired justified line measure. The length of the composed line of elements, including fixed spacer elements between words, may be either equal or proportionate to the sum of the variant widths of the different characters and word spaces making up the line, such widths being represented by a dimension such as the edgewise thickness of the respective elements, and for photographic purposes the elements may bear their characters on or in a plane between their flat side faces which are normal to their edges. The composed line of elements is delivered from the composing or assembling station on the machine to a line measuring station where there is provided co-acting line-measuring devices including a line-follower, such devices being operative to compact the composed line of elements endwise with its leading end against a fixed wall, and the extent of movement of said members providing a gauge or index of the amount by which the length of the compacted line of elements differs from the justified line measure to be produced. The elements are then removed one-by-one edgewise from the leading end of the line and moved first to a photographing position for exposure of their respective characters successively in line on sensitized paper or film and then to a discharging position for return to their places of storage. After each removal of an element from the line the remaining elements are advanced to bring each next element into position for removal and simultaneously to advance the sensitized surface for receiving the successive exposures. These step-by-step advances are effected by the aforesaid line-follower with which is associated one of the members of the co-acting line measuring devices referred to and which is arranged to move under control of another member of said devices in such manner that the extent of the advances of the follower and sensitized surface due to the variant thicknesses of the successively removed elements is altered by a portion of the measured line-length difference proportionate in each instance to such thicknesses.

Thus, the photographically produced line attains the desired justified length by distributing the total measured amount of line-shortage among the successively produced characters as well as the word spaces throughout the entire line in variant amounts proportionate to the variant widths of the respective character elements and fixed word-space elements.

The foregoing novel manner of effecting justification of lines of type matter has the advantage of materially improving typographical appearance, it being evident that the practice heretofore of distributing the total shortage in a composed line among only the relatively few word spaces is bound to produce wider gaps between words than would be the case if such total shortage were distributed among all of the characters as well as the word spaces. However, it will be apparent to those skilled in the practice of type composition that the amount of line-shortage is sometimes difficult for the compositor to control, and especially for the shorter line measures the amount of shortage may be rather large if another word or a properly formed syllable cannot be fitted in. In such cases distribution of such excessive line-shortage in the foregoing manner (among all of the characters and the word spaces) may result in objectionable typographical appearance due to excessive separation of the individual letters. It is this contingency that the present invention aims to circumvent.

Thus, an object of the present invention is to provide means whereby whenever, in spite of all feasible manipulation by the compositor, the length of a composed line of elements falls excessively short of the justified measure to be produced, some arbitrary portion of such shortage may be taken up or absorbed between the word spaces only, and this prior to the above mentioned line measuring operation and subsequent distribution of the remaining amount of shortage among all the characters and the word spaces. Stated in another way, whenever the shortage in a composed line of elements exceeds a predetermined maximum it is contemplated first to reduce such shortage to at least that maximum by partially expanding only the word spaces, then to measure the partially expanded line and thereafter distribute the remaining shortage, determined by such measurement, among the individual characters and word spaces in variant amounts in accordance with their variant setwise widths.

For partially expanding the word spaces in a composed line of elements to reduce its over-all shortage prior to its reproduction to a justified length the invention provides word-space elements which are expansible in edgewise thickness or width rather than fixed, such elements generally resembling the well known sliding wedge "spacebands" used in typographical line composing and type-slug casting machines. And according to the invention such expansible elements may be adjusted either manually at the line composing station on the machine or automatically at the line measuring station prior to operation of the line-measuring and type line producing devices.

For present purposes and for adaptation to the aforementioned kind of machine the expansible spacer elements employed differ from the "spacebands" alluded to in that they are much shorter when fully extended (non-expanded), have considerably less range of expansibility and have a "sleeve" or stationary member which preferably has the same general configuration as the character-bearing elements. Also the wedge member thereof which slides in the sleeve is considerably narrower than said sleeve and may be either frictionally or freely slidable therein as later explained.

For manual adjustment of such spacer elements to reduce excessive line shortage at the line composing station there may be provided a driver bar extending over the entire length of the line composing receptacle and capable of limited movement by the operator to actuate the depending wedge members to effect expansion of the spacers. Alternatively, for automatically adjusting such spacer elements at the line measuring station a driver bar may be provided in association with the channel supporting the composed line of elements at this station and such driver bar may be operated by a suitable driving cam and lever timed to effect adjustment of the spacer elements just prior to the line measuring action of the line-measuring devices, thus to expand the word spaces in the line and thereby reduce the amount of shortage to be measured and later distributed in effecting justification.

With the manual spacer adjusting arrangement the spacer elements are preferably constructed, as already known, to provide friction between the two parts thereof—the stationary sleeve and the sliding wedge—so that after the wedges are pushed up at the line composing station they will stay up and thus maintain the widened word spacing during delivery of the line to the line measuring station and during the subsequent line measuring and reproducing operations. To provide the desired friction it is contemplated herein to split the sliding wedge longitudinally from its upper end and downwardly to within a short distance from its lower end, then to laterally spread apart or otherwise distort the free legs thus formed. When the wedge member so formed is assembled in the usual undercut guiding grooves provided for it in the sleeve member the two parts will bindingly engage one another in different relative positions of adjustment. A fixed lip or rail may be provided on one wall of the composing receptacle to overhang the lugs of the character elements and the sleeve members of such friction spacers, thus to prevent such parts from being displaced upwardly when the spacer wedges are driven up.

With the automatic spacer adjusting arrangement the friction type of spacer may also be used, if desired. However, the usual free sliding "spaceband" construction is all that is necessary since with the automatic arrangement it is contemplated to lock the driver bar in the position it assumes in driving up the spacer wedges a limited extent at the line measuring station. The driver bar thus locked provides a support for holding up the otherwise "free-to-slide" wedges during the line measuring operation and also supports them in their "up" position subsequent thereto, that is, during the successive advances of the elements remaining in the line, including the spacers, after each removal of an element from the leading end thereof, the spacer wedges so supported, as they slide longitudinally along the locked driver bar, maintaining their expanded thickness value until they reach the point of their own removal at the leading end of the line.

As herein provided for, the spacer elements may be stored in extra channels provided in the storage magazine for the character elements, and may be provided with at least one set of teeth in the V-shaped upper end of their sleeve member for circulating them after use through distributing devices of the machine for return thereby to their particular storage channels.

The invention will now be described in connection with the accompanying drawings wherein:

Figure 1 is a front elevation on a reduced scale showing the portions and organization generally of a machine to which the invention may be applied, the mechanism for manual adjustment of the spacers at the line composing station being shown.

Figure 1a is a perspective view of a form of character bearing element suitable for use with the invention.

Figure 2 is an elevation of a friction spacer element, viewed from the front side.

Figure 3 is an elevation of a friction spacer element, viewed from the rear side, and showing the element in relation to the wedge depressor at the element discharging position.

Figure 4 is a fragmentary sectional view showing the details of structure at the element discharging position at the top of the feed channel for depressing the wedge members of the spacers, a spacer being shown approaching the depressor.

Figure 5 is similar to Figure 4, but shows the spacers fully elevated with the wedge thereof depressed, ready for discharge laterally by the discharging pusher.

Figure 6 is similar to Figures 4 and 5, but shows the spacer discharged by the pusher onto the element collecting bar.

Figure 7 is an elevation of the line composing receptacle with the manually operated spacer adjusting devices attached thereto.

Figure 8 is an elevation from the left end of Figure 7.

Figure 12 is a fragmentary end elevation in section taken on the line 12—12 in Figure 1 but enlarged, or as viewed from the right hand end of Figure 7.

Figure 13 is a fragmentary section of the lower end of the storage magazine for the character and spacer elements, and shows the manner in which the spacer elements are stored in their channels.

Figure 14 is a fragmentary front elevation of the devices at the line measuring station of the machine in actuated position relative to a schematically indicated composed line of elements which latter contains word spacers adjusted at the assembling station prior to delivery of the line to the measuring station.

Figure 15 is a fragmentary detail in section of the line-follower and co-acting line measuring devices, the section being taken generally on the line 15—15 in Figure 17.

Figure 16 is a front elevation of the devices including the element feed channel at the line measuring station on the machine, and shows the alternative automatically operated spacer adjusting bar.

Figure 17 is an end elevation of the mechanism shown in Figure 16, with the components comprising the element feed channel removed.

Figure 18 is an elevation of a free sliding spacer element such as may be used with the automatic spacer adjusting arrangement of Figures 16 and 17.

Figure 19 is an elevation, in section, viewed from the left side of the machine, showing certain levers and cams for operating the line measuring devices and the lock therefor when the word spacers are adjusted manually at the line assembling station.

Figure 20 is a plan view in section taken on the line 20—20 of Figure 19.

Figure 21 is an elevation similar to Figure 19 but with an additional lever, cam and lock as required for the automatic word-spacer adjusting arrangement of Figures 16 and 17.

Figure 22 is a plan view in section taken on the line 22—22 of Figure 21.

Figure 23 is a fragmentary front elevation of the parts illustrated in Figure 22.

Figure 9:
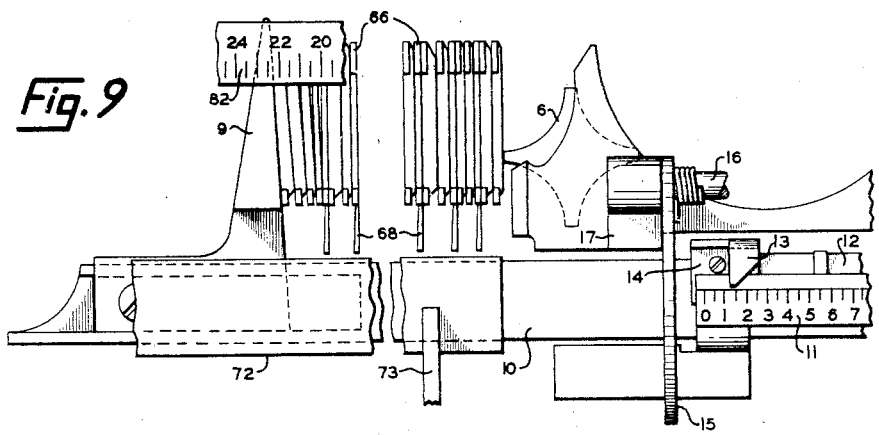
Figure 9 is a fragmentary detail view showing a composed line of elements the length of which falls excessively short of the line measure to be set, thus requiring adjustment of the expansible word-space elements to bring its composed length within a predetermined maximum.

For purposes of convenience and completeness there is herein shown portions of the well known organization of mechanism for composing lines of elements in commercial typographical machines, and also the mechanism associated therewith and described in detail in Patent No. 2,395,659 already referred to, for effecting justification of such lines progressively during photographic reproduction of the characters contained in the line. In the ensuing description, therefore, it is deemed sufficient simply to explain and refer to such mechanisms in a general way and to the extent necessary only for a clear understanding of the improvements in connection therewith as provided by the present invention.

Thus, as seen in Fig. 1, the right hand side of the machine embodies the element storage magazine 1 from which, in response to manipulation of the keyboard 2, the elements drop by gravity through walled passages 3 onto the downwardly inclined belt 4 running in the direction indicated by the arrow and adapted to convey them in the order of their release to a common assembling point at the right end of the well known assembling elevator 5. The rotating star wheel 6, Fig. 7, flips the successively conveyed elements to an upright position edgewise on front and back rails 7 and 8 respectively, and advances them leftward against light spring tension applied to the usual upright finger 9 secured to the assembler slide bar 10 and adapted to support the leading end of the line. By observing an em scale 11 relative to which a member 12 carrying a pointer 13 is adjustable initially along bar 10 to the line measure being set, the operator is aware of the growth of the line, and as pointer 13 approaches the zero mark on the scale he is conscious of the necessity to cease composition and end the immediate line with a word or properly formed syllable. Pointer 13, as best seen in Fig. 12, comprises a forwardly bent-over portion of a bracket 14 the left edge of which limits leftward movement of the slide bar 10 upon engagement against the side of a lever 15 pivoted at 16 and commonly known as the "tight line release." For present purposes and as hereinafter explained bracket 14 engages lever 15 when pointer 13 arrives at the one-half em mark on scale 11. Should lever 15 be tilted up, see Fig. 11, as it is in order to relieve the line of the tension rightward of finger 9 when hand manipulating the elements to correct an error or the like, or to admit into the line an extra element to complete a word or a syllable, the left edge of bracket 14 then stops against the right edge of block 17 which carries pivot stud 16, whereby to limit leftward movement of the slide bar 10, and in such instance pointer 13 may reach the zero mark on scale 11.

The left hand side of the machine embodies the line-measuring and justifying and photographing mechanisms which function in the manner hereinbefore outlined. Thus there is provided the line follower generally designated by the numeral 18, Figs. 1 and 14 to 17 inclusive, which is secured as by an angle bracket 19 to the well known line delivery slide 20. A latch 21 holds slide 20 and follower 18 in its normal or starting position indicated in Fig. 1 against the action of a spring 22 urging the delivery lever 23, attached in known manner at its upper end to the slide, to swing leftward on its pivot 24. When the elevator 5 is raised by the operator to "send in" the composed line of elements $M^1$, Fig. 1, it rocks latch 21 and the slide and follower thus released serve to sweep or deliver the line from the raised position $M^2$ leftward onto rails 25 which support the elements during such delivery and also at the line measuring station $M^3$.

The delivery stroke of follower 18 is stopped at the line measuring station by a lug 26 on a block 27 adjustably secured to a crossbar 28 mounted rigidly on a pair of rods 28a which are slidably guided in a fixed bracket 28b. Through the medium of a cam and lever (not shown) this crossbar is elevated, first to interpose lug 26 momentarily in the path of the follower at the line measure position to which block 27 is set according to the em scale 29 on the crossbar, then to engage lug 26 in notch 30 in the follower during operation of the line measuring devices 31, 32 and 33, as seen for example in Figs. 14 and 15. As already pointed out, the construction and operation of these devices is fully described in the aforesaid Patent No. 2,395,659 to which reference may be had, if desired, for specific details. Suffice it to explain briefly here that to gauge or measure the length of the composed line of elements, rail 31 pivoted at 34 and normally inclined downwardly to the right (Fig. 1) out of the path of roller 35 on a wedge member 32, is rocked by cam and lever action, Fig. 19, upon a rod 36, freely linked at its upper end to rail 31, immediately upon locking of lug 26 in the follower notch 30. When so rocked, rail 31 drives member 32 upwardly in its guideway in the follower, see Fig. 15, and this in turn, through a roller 37, drives plunger 33 leftward against the action of a spring 38. As a result the head 39 of plunger 33 acts to compact the line of elements endwise against a fixed wall 40 adjacent to the leading (left) end of the line and constituting part of the channel 40a in which the elements are fed upwardly to photographing and discharging positions as later explained.

The extent of movement of plunger 33 and rail 31 necessary to firmly compact the composed line of elements depends directly upon the amount by which the length of the line falls short of justified line measure to be produced (indicated by the setting of block 27), and it is this total amount of "shortage" that must be distributed or used up in the subsequent progressive line justifying operation. Accordingly, rail 31 is locked in the inclined position it assumes in compacting the line, there being provided for this purpose the slidable bolt 41, Figs. 19 and 20, which at the appropriate moment is driven forwardly against rod 36 by a lever 42 controlled by a cam 43. In Fig. 19 is also shown the cam 44 and lever 45 for actuating rail 31, and it will be observed that by means of roller 46 on lever 45 the latter is operated to effect measuring of the line prior to response of roller 47 on the bolt operating lever 42 to the depression in cam 43.

Subsequent to locking of rail 31 by bolt 41, the cam and lever (not shown) for controlling the vertical movements of crossbar 28 act to lower the latter to withdraw lug 26 from notch 30 and dispose this lug entirely clear of the path of movement leftward of the line follower 18. Simultaneously with the lowering of crossbar 28 a plate 48 secured thereto encounters a stud 49 in the vertically slidable rod 50 which carries a stop 51 normally engaging a complementary stop 52. Depression of rod 50 (against a spring 50a) and stop 51 thereon releases the film feed bar 53 for movement leftward in response to the step-by-step advances of the follower 18 (released for leftward movement by withdrawal of lug 26) as the line elements are now removed one by one successively from the leading end of the compacted line thereof and fed upwardly in the guide channel 40a.

Removal of the elements individually may be effected by any suitable means such as the vertically reciprocable displacing bar 54 carrying a roller 55 engaged in the rising and falling camway 56 of a drum cam 57, the latter being rotated on a vertical axis as by a belt and pulley drive 58. Bar 54 is provided with three sets of pawls 59, 60 and 61, the lower set 59 engaging the upper lugs of the leading line element and elevating such element to the photographing level or optical axis O—O along channel 40a. At this level the element is momentarily held at rest by a member (not shown) engageable in the notch K of the element, see Fig. 1a, for retaining and aligning the element accurately on the optical axis during the photographic exposure which takes place while bar 54 descends under control of camway 56. On the next rise of bar 54 the lower pawls 59 engage and elevate the next leading element to the optical axis level while the middle set of pawls 60 elevate the previously photographed element along wall 40 to an intermediate level. And on the next descent of bar 54 the next leading element is engaged by pawls 59 and raised to the optical axis level, while the immediately preceding element is simultaneously raised by the middle pawls 60 to the intermediate level as the first removed element is raised by the upper set of pawls 61 from said intermediate level to the uppermost level along wall 40. As the successive elements arrive at the uppermost level they are discharged laterally from the guide channel by a reciprocating pusher 62 which feeds them onto the usual ribbed second elevator bar 63, the latter operating upon receiving the last discharged element to elevate the accumulated line of elements to the distributing devices of the machine (not shown) for return of the respective elements to their proper storage channels in the magazine 1.

As previously pointed out, in response to each removal of an element the remaining elements in the line at station $M^3$ are advanced by the follower 18, thus to present each next element at the removal position against wall 40. And simultaneously with such successive advances the follower 18 advances the film (or a suitable holder therefor) in order to present fresh areas thereof for receiving the successive photographic exposures. The follower and film advance together by reason of being locked by a spring latch 64 to the film feed bar 53, this latch being pivoted on a rider 64a settable to the desired line measure along bar 53, whereby the latch locks with the follower at the moment lug 26 engages the latter to stop its line delivery stroke. The extent of each advance of the film is equal to the edgewise thickness of the particular removed element plus an incremental part of the amount of line shortage gauged by the inclination of rail 31. The value of the shortage increments added to the thickness of each removed element is determined by the distance plunger 33 recedes (under the urge of spring 38) as roller 35 travels along rail 31, and it will be evident that as a result of each such recession (as spring 38 drives wedge member 32 downward) the distance which the latched-together follower and film feed bar may advance leftward is increased.

Since the edgewise thickness of the line elements varies in accordance with the setwise width of the characters borne by the respective elements on their flat or broad side, it will now be apparent that the characters in the photographically reproduced line will be spaced apart in accordance with their variant setwise widths plus, in each instance, a portion of the measured amount of line shortage determined by and proportionate to such widths. And it will further be apparent that upon completion of the line of exposures the total measured amount of line shortage will be entirely used up or distributed throughout the line so that the finished line will be of the desired justified length.

One form of element having characteristics suitable for carrying out justification in the foregoing manner, and for so doing in producing lines of type matter photographically, is designated M in Fig. 1a. Such form of element is also described in detail in Patent No. 2,395,659 hereinbefore referred to and to which reference may be had if desired. Suffice it to say that the over-all thickness dimension A of such element is made equal or proportionate to the setwise width of the character on the film plaque B carried in an opening or recess cut through the element body.

Upon advance of follower 18 after removal of the last line element a pin (not shown) strikes and rocks latch 64 whereby the follower is unlocked from the film feed bar and thus rendered free to return to its starting position indicated in Fig. 1. It will be understood that the machine is provided with suitable driving mechanism (not shown) for turning the cam shaft 65, Fig. 19; that such driving mechanism includes start and stop controls (not shown) for (a) starting shaft 65 as soon as lug 26 stops the delivery stroke of follower 18, (b) stopping said shaft after turning sufficiently (about 150°) to lock rail 31 in the position it assumes in compacting the line, (c) starting the shaft again after discharge onto bar 63 of the last line element and turning it through the remaining 210° of its full cycle whereby to return the various parts to their normal or starting positions and (d) finally stopping the shaft. It will be understood also that other cams besides the two shown in Fig. 19 are carried by shaft 65, including a cam for effecting the return (clockwise) stroke of the delivery lever 23 to restore the follower in locking relation with latch 21.

Up to this point it will be understood that the composed line of elements contains no spacebands or equivalent thereof, the words being separated only by fixed spacer elements similar to the character elements, such spacer elements being fed through the photographing position but recording only blank spaces on the film. The specific apparatus and method according to the present invention which contemplates employing adjustable rather than fixed spacer elements between words, whereby to afford the operator the desirable wider range of manipulation of lines in cases of excessive shortage, will now be described.

*Friction spacers and manual adjustment thereof at line assembling station*

According to one embodiment of the present invention there is provided for insertion between words during composition of a line and for adjustment at the line assembling station on the machine an adjustable spacer element of the form best illustrated in Figs. 2, 3 and 13. As hereinbefore pointed out, this element simulates in general the well known expansible wedge "spaceband" employed in commercial typographical machines. The distinguishing features of the the element here employed over the usual "spacebands" are (a) that the stationary or upper member 66 thereof has the general configuration of the character element as shown in Fig. 1a, including the aligning notch K, (b) that the V-shaped notch formed in the top of member 66 has one pair of opposed teeth 67 intended to support the element on bar 63 when discharged from the feed channel 40a whereby the element may be carried to and distributed by the distributing devices of the machine to a storage channel in the magazine 1, see Fig. 13, (c) that the depending adjustable wedge member 68 is so formed as to frictionally engage the upper member 66 and thus hold its adjusted position relative thereto; (d) that this member is relatively short as compared to the long depending wedge of the usual spacebands and is narrower than the member 66.

To provide for frictional retention of member 68 in different adjusted positions with respect to member 66, the former member may be constructed as shown wherein it is formed with a split or slot 69 extending from its upper and downwardly to within a short distance of its lower end. For reasons shortly to appear slot 69 is located to one side of the center of member 68, and after slot 69 is made the two legs formed thereby may be slightly spread apart in a flat plane or may be slightly sprung laterally in opposite directions, thus to cause these legs, when assembled in the usual dovetail or undercut grooves 70 in member 66, to bindingly engage said grooves and accordingly slide therein with such moderate friction as to hold member 68 in whatever position it may be moved relative to member 66. As seen, member 68 is made narrower than member 66 in order to clear the apex of notch K in the latter. And as will be observed in Fig. 13, member 68, when fully extended downwardly nests with slight clearance in the V-shaped notch of member 66 of adjacent spacer element stored in a channel of magazine 1. To those familiar with the usual storage magazines for character bearing elements of matrices as employed in typographical machines, it will be evident from Fig. 13 that the spacer elements just described may be stored in such magazines in the manner illustrated and may be released therefrom in response to actuation of a special key on the usual keyboard which is arranged, as well known to rock the escapement 71 to effect such release.

The foregoing or equivalent form of friction spacer elements are employed according to the invention in the manner best understood by reference to Figs. 7 to 11 inclusive. Thus, referring to Fig. 9, the compositor may be dealing with a line which upon completion of a word or a syllable falls short of the desired line measure (say 24 ems which is the measure required for the particular job in hand) by somewhat more than 1-em as indicated by the position of pointer 13 on scale 11. Remembering now that lever 15 is one-half em thick, whereby pointer 13 reads one-half em when bracket 14 stops against this lever, and assuming that even by raising lever 15 the operator finds it impossible to attain a proper endpoint for the immediate line by the addition of another letter (element), the total "shortage" to be dealt with is something in excess of one and one-half ems. Should such rather large amount of "shortage" be distributed among all of the characters and word spaces produced in the manner hereinbefore described it is likely that the individual characters would be "letter-spaced" too widely and give an objectional typographical appearance.

To overcome this possibility means is provided for adjusting the expansible spacer elements 66, 68 manually at the line assembling station, thus to absorb or distribute among the word spaces to be produced a portion of the excessive "shortage" indicated on scale 11, such portion being purely arbitrary and limited to the extent that at least one-half em of the "shortage" shall always remain to be distributed among the characters as well as the word spaces in effecting justification. More specifically, having available the spacer elements herein provided, the operator is given facility to adjust the word spacer in any line that falls short of the desired measure being set by more than a maximum of say 1-em (with lever 15 down) in order to reduce such shortage to at least that maximum before "sending in" such line.

The manual spacer adjusting means alluded to comprises a driver bar 72 disposed horizontally beneath and over the entire length of the element supporting channel in the assembling elevator 5, this bar being rigidly secured at opposite ends to vertical posts 73 which in turn are slidably supported in grooved guide plates 74 suitably secured to portions of a fixed frame member 75 of the machine. In bearing lugs 76 extending forwardly from frame member 75 is supported a cross-shaft 77 having pinned thereto crank arms 78, see Fig. 8, the inner ends of which set in recesses in the respective posts 73. A finger lever 79 is secured to shaft 77 for turning the latter.

As clearly shown in Fig. 8, the disposition of driver bar 72 is such that when elevated by turning shaft 77 its upper edge will encounter the lower ends of the depending wedge members 68 of any of the spacer elements in a composed line of elements in the line assembling channel. It will be observed too that finger 9 which is advanced along the line assembling channel as the elements are fed thereto is cut out or narrowed laterally and to the height indicated by the numeral 80 in order to clear the driver bar 72 and enable the latter to be moved upwardly for driving up the spacer wedges 68. Also as seen in Fig. 8 there is provided along the upper edge of the usual hinged front gate of the assembling elevator 5 a fixed plate 81, see also Fig. 12 which overhangs the assembling channel so as to overlie the upper lugs of the character and spaced elements in said channel, thus to prevent vertical displacement of such elements when the wedges of the spacer elements are driven upwardly.

Reverting to Fig. 9, and assuming that the justified line measure to be produced is 24 ems, the composed line of character and word-space elements shown in Fig. 9 is short of such measure by something in excess of one and one-half ems as previously stated. This amount of shortage, the "actual" shortage, is indicated on the usual em scale 82 along the upper edge of the assembler gate when read in conjunction with the inner edge of finger 9. Such reading on scale 82 is, of course, always one-half em more than the reading indicated by pointer 13 and scale 11 in order to allow that after expansion of the word-space elements there shall be left at least one-half em of shortage to be distributed among the characters as well as the word spaces in the line justifying operation. This "hidden" one-half em leeway is provided for by offsetting scale 82 relative to scale 11 by one-half em, thus relieving the operator of the necessity to calculate or to remember to leave at least this amount of shortage for use in the justifying operation.

Figure 10:
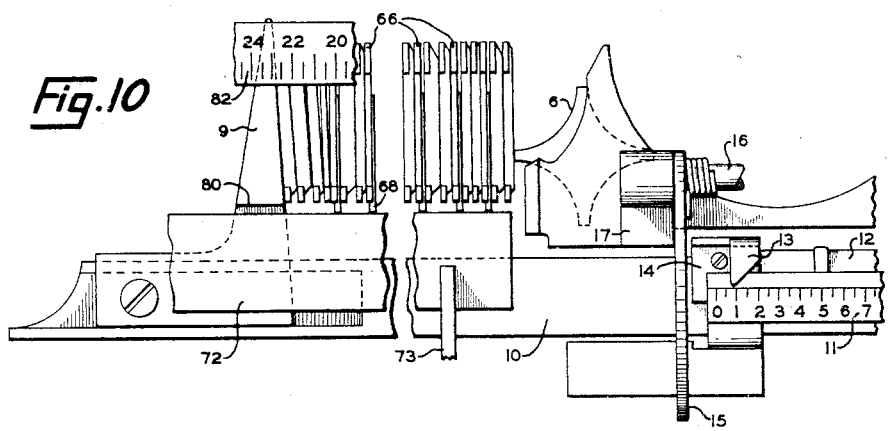
Figure 10 is similar to Figure 9 but shows the word-space elements expanded by the manually operated adjusting bar of Figure 7, thus reducing the excessive line shortage as required.

As shown in Fig. 10, elevation of driver bar 72 has resulted in advancing pointer 13 to an indicated shortage on scale 11 of something less than one em, the star wheel 6 having served to block or support the right or terminal end of the line so that expansion of the spacers is effective only in concurrent advance of finger 9 and pointer 13 leftward. As seen, the "actual" shortage of the expanded line of elements as sighted on scale 82 is still one-half em more than the shortage indicated on scale 11. It is this arbitrary remaining amount of shortage that is to be distributed among all of the characters and words throughout the line to be produced by the subsequent progressive justifying operation as hereinbefore described.

Figure 11:
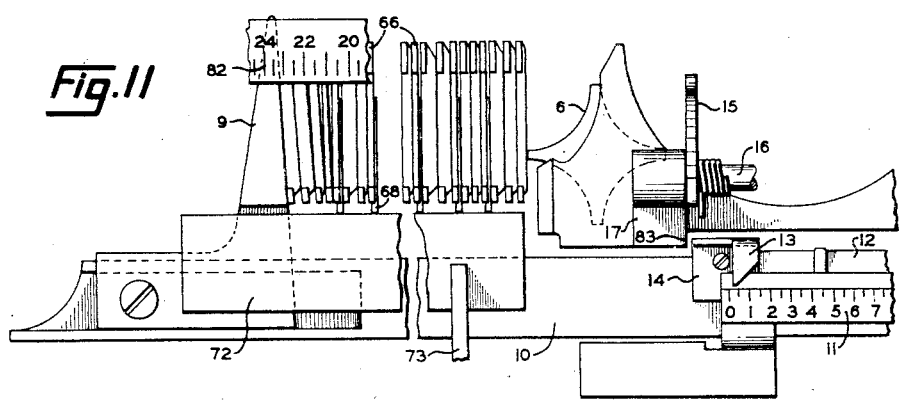
Figure 11 is similar to Figure 9 but shows a condition where the tight line release lever has been thrown out to make available the maximum space possible in which the operator may manipulate in attempting to fill out the composed line.

In Fig. 11 is shown the driver bar 72 elevated to adjust the word-spacers in a line of elements which the operator has found possible of properly terminating in respect to a word or a syllable by adding another character element, room for which element has been made by raising lever 15 out of the path of bracket 14 whereby to permit the latter and finger 9 to advance leftward toward the limiting stop provided by the edge 83, Fig. 11, of the hinge support block 17 for lever 15. As indicated, adjustment of this line has brought pointer 13 within the one-half em mark or scale 11. By observing the position of finger 9 relative to scale 82 it will be seen that here again the amount of shortage indicated by pointer 13, that is a shortage of less than one-half em is not in fact the total or "actual" remaining shortage. Instead, the total remaining shortage as read on scale 82 is still one-half em more than indicated by the reading on scale 11. And due to the one-half em thickness of lever 15, the shortage remaining as read on scale 82 would be exactly one-half em if expansion of the spacers should advance the pointer 13 to the zero mark on scale 11, a condition which may occur if the expansive capacity of the spacers is sufficient.

The condition last mentioned wherein a zero on scale 11 corresponds to a one-half em shortage reading on scale 82 is significant in that it means that a line of elements never can be adjusted by expansion of the word-space elements at the assembling station to the extent that its adjusted length corresponds to the ultimate justified line measure desired. In short, the intention and the arrangement herein is such that justification as such shall not be possible of accomplishment at the assembling station. Instead, there shall always remain in any line, whether or not the spacer elements therein are adjusted at the assembling station, a remaining shortage of at least one-half em to be measured and then distributed among the characters and word spaces throughout the line in increments proportioned to and determined by the set-wise widths of the respective character and word-space elements.

From the fact that the spacer elements here employed are maintained by friction in their adjusted positions it will be evident that the driver bar 72 may be allowed to drop by gravity immediately after its elevation by finger lever 79 to adjust the spacers. The adjusted line may then be "sent in" in well known manner by raising the assembling elevator 5 to dispose the line in the position M² in front of the line follower 18 as indicated in Fig. 1, whereupon it is delivered by the follower to position M³ for reproduction as a justified line.

It should be understood that the spacer elements herein provided afford to the operator the facility for reducing excessive shortage in lines whenever that act is judged necessary. This is a matter for the operator to determine, and as an aid he may use as a maximum "shortage" standard on scale 11 the one-em figure herein used by way of illustration, or some other standard such as one-half em, for example.

The question, therefore, of whether or not to reduce the "shortage" as read on scale 11 and what standard to use as a guide is up to the compositor to decide—either affirmatively in cases of obvious necessity, or governed in other cases by the nature of the composition in hand as to design, size and environment of the type face, and the possibility, by reason of this added facility on the machine, of handling lines otherwise incapable of that nicety of spacing necessary to fine typographical appearance.

Automatic spacer adjustment at line measuring station

According to another embodiment of the invention excessive "shortage" in a composed line may be reduced automatically at the line measuring station M³ on the machine, instead of manually at the assembling station M¹. With this arrangement a counterpart of the driver bar 72 is provided at the station M³ which operates to adjust the word-space elements to a limited extent in each line prior to the line measuring and justifying operations. While the friction spacers 66, 68 already described may also be employed with this automatic arrangement, the similar but non-friction or free sliding spacer element 66a, 68a in Fig. 18 will serve equally well as will shortly be seen.

Referring now to Figs. 16 to 23 inclusive, there is provided at station M³ a driver bar 84 mounted on upright posts 85 which are slidable in guides in the fixed bracket 28b, this bar being disposed horizontally below and generally centrally fore and aft of a line of elements supported on rails 25 at the line measuring station M³. At their lower ends posts 85 are rigidly secured in a tie bracket 86 which latter is hingedly connected to the front end of a lever 87 through the medium of a free link 88. By means of a roller 89 at the rear end of lever 87, see Fig. 21, which roller follows a cam 90, by reason of spring 91 acting on the lever, the driver bar 84 is caused to rise and fall as required during rotation of the cam shaft 65. It will be noted from Figs. 16 and 17 that the lower end of the line follower 18 is provided with a cross-cut or channel 92 of sufficient width and depth to accommodate the bar 84 and permit its elevation to the required height.

For an understanding of the operations of driver bar 84, attention is directed now to the line of elements indicated schematically by dot-dash lines in Fig. 16, and to the cam, lever and lock shown in Figs. 21, 22 and 23 for controlling the driver bar 84. By way of example, the line of elements at station M³ may be assumed to be short of the justified line-length desired to produce to the extent designated X. That is, when lug 26 on block 27 (the latter being set at the desired line-length along scale 29) stops the line delivery stroke of follower 18 and plunger 39 is in its then fully retracted position as shown by full lines in Fig. 16, the leading end of the line stands at the distance X from the fixed wall 40, this distance representing the total or "gross" amount of shortage in the immediate line.

Remembering now that the first action occurring upon interruption of the line delivery stroke of follower 18 is the elevation of cross bar 28 whereby to lock lug 26 in notch 30, and that at such time roller 35 always stands clear of rail 31 in the normal position of the latter (downwardly to the right as in Fig. 16), the next action to take place according to the present invention is a slight advance of plunger 39 by rail 31. Such slight advance occurs by reason of the intermediate step 94 provided between the high and low contours of cam 44a in Fig. 21, as compared to the single direct drop in the contour of the corresponding cam 44 in Fig. 19. Thus, as soon as the cam shaft 65 starts turning (as it does under the control of a switch 95, Fig. 1, closed by tilting of latch 64 while locking with the follower 18 and by other controls which are not shown), roller 46 on lever 45 encounters the intermediate depression 94 in cam 44a. As a result the forward end of lever 45 acts to impart a preliminary tilt to rail 31, to the extent permitted by depression 94, the rail assuming thereby the tilted position 31a indicated by dot-dash lines in Fig. 16. As will be apparent, rail 31 when tilted to such position encounters roller 35 whereupon wedge member 32 is driven upward and plunger 39 correspondingly leftward from the full line position in Fig. 16 to the adjacent dot-dash position indicated at 39a. In consequence the entire line of elements is moved correspondingly closer to wall 40, the leading end of the line now standing a distance Y from said wall.

Immediately following this, roller 89 encounters the drop 95 in its cam 90 whereupon lever 87, under the urge of spring 91, operates to elevate driver bar 84 which in turn drives up the depending wedges 68a of the word-space elements in the line. Such action results, of course, in elongating or expanding the line only to the left, the follower 18 being still locked with and held stationary by lug 26. The driver bar 84 will rise until stopped either by reaction thereon of the spacer elements after being driven up to the extent that the line is tight between the advanced plunger 39 and wall 40, or by reason of the fact that the driver reaches the top of the crosscut 92 in follower 18 before the line is made tight by expansion of the spacer elements. Should the amount of line shortage represented by the distance Y (the shortage after the preliminary advance of plunger 39 by rail 31) be so great that the expansive capacity of the spacers present (be they few or many) is insufficient to expand the line by that amount, driver 84 will rise to full height or until stopped by the upper wall of the crosscut 92, or to the level designated 84a in Fig. 16. On the other hand if the amount of shortage represented by distance Y is so small that only a partial drive upon and expansion of the spacers is sufficient to make the line tight between plunger 39 and wall 40, then the wedge spacers themselves will stop the driver 84 at some intermediate level, for example at 84b.

By way of example, the line of elements shown schematically in Fig. 16 is an excessively short line, simulating intentionally the line shown in Fig. 9 which is more than one and one-half ems short of the line-length ultimately desired—say 24 ems. Accordingly, after driver 84 rises to its full height 84a in driving up the spacer wedges the line shown is still loose, its leading end standing at a distance Z from wall 40 with the plunger 39 in the dot-dash position 39a where it is momentarily held due to rail 31 being disposed at position 31a while roller 46 is riding over the intermediate depression or step 94 of cam 44a.

Immediately after this, as cam shaft 65 continues to turn, roller 46 rides off the intermediate step 94 whereby the locking lever 45 is conditioned again to tilt rail 31. The resulting upward drive of member 32 now moves plunger 39 and the expanded line of elements leftward bodily through the distance Z to make the line tight against wall 40, the "driven up" spacer wedges sliding along the fully elevated driver 84. Immediately following this, roller 47 and its lever 42 respond to the depression in cam 43, whereby the locking bolt 41 is moved into engagement with rod 36 to lock rail 31 in such inclined position as it may have assumed in advancing the line through the distance Z.

Simultaneously with the aforesaid locking of rail 31, another locking bolt 96, Figs. 22 and 23, similar in kind and arrangement to the bolt 41 is moved into engagement with one of the posts 85 which carry the driver bar 84, thus to lock the latter in such elevated position as it may have assumed in driving up the wedge spacers. Bolts 41 and 96 are worked simultaneously by lever 42 through the medium of a forked arm 97 the forked end of which engages over a tie piece 98 to which the free ends of the bolts are attached. As seen, the forked arm 97 is pinned to one end of a rock shaft 99 which has secured to its opposite end a crank arm 100, the latter being connected to the bolt operating lever 42 by a free link 101.

From the foregoing it will be seen that the total or "gross" shortage indicated by the distance X—one and one-half ems in the particular line under discussion—has been dealt with automatically at the line measuring station M³ in the following manner:

1. A small portion was first consumed by the preliminary tilting of rail 31 to position 31a, the amount consumed corresponding to the bodily advance leftward of the line by movement of plunger 39 to position 39a and consequent reduction of distance X to distance Y;

2. A further portion was next consumed by expansion of the word spacers by driver 84 elevating to position 84a, this amount corresponding to the reduction of distance Y to distance Z by elongating the line leftward with the plunger held at position 39a;

3. The remaining portion was consumed by further tilting of rail 31 so far as necessary beyond position 31a to advance the plunger and line of elements bodily through distance Z;

4. Rail 31 and driver 84 were simultaneously locked in the respective positions they assumed in making the line of elements tight between plunger 39 and wall 40;

5. The actual amount of shortage measured by the line measuring devices 31, 32 and 39 was gauged or recorded thereby by the locking of rail 31 in its final tilted position, such amount of shortage being represented by the total advance of the plunger or distance D in Fig. 16, and this being the "net" amount of shortage remaining to be distributed by the progressive justifying action next to follow.

It will now be evident that the "net" shortage remaining to be distributed among the individual letters and word spaces throughout the line to be photographically produced is less than the total or "gross" shortage which the compositor found impossible to fill out in composing the line at the assembling station. And it will be clear that such "gross" shortage was reduced to the "net" amount by expansion or widening of only the word spaces. Accordingly when the now partially expanded word spaces and all of the letter spaces as well are subsequently altered in width whereby to absorb the "net" shortage D to effect justification the alteration increments will be so small (as compared to the increments necessary to absorb a "gross" shortage X) as to be virtually impossible of detection and produce no perceptible effect by way of letter-space distortion in the typographical appearance of the line produced.

The preliminary tilting of rail 31 to position 31a and the resulting advance of plunger 39 is a deliberate provision having a similar purpose to the one-half em discrepancy in the readings of scales 82 and 11 in connection with the manual spacer adjusting arrangement hereinbefore described. Thus, with the automatic arrangement it is also intended that the action of driver 84 in expanding the word spaces shall never operate to use up all the shortage in a line. Instead, there shall always remain to be distributed during the progressive justifying action at least a fixed amount of shortage represented by the constant distance plunger 39 is preliminarily advanced by reason of the intermediate step 94 in cam 44a—an amount which may, for example, be one-half em as with the manual arrangement.

As stated earlier in this specification and described in detail in the Patent No. 2,395,659 to which reference has repeatedly been made, the cam shaft 65 is stopped after turning sufficiently (about 150°) to lock rail 31 and to lower cross-bar 28 whereby to withdraw lug 26 from notch 30 and dispose said lug clear of the path of movement leftward of follower 18. Also, upon lowering of cross-bar 28 plate 48 thereon depresses the vertical rod 50 to remove stop 51 thereon from the path of stop 52 on the film feed bar 53, thus releasing the follower 18 and feed bar 53 latched thereto for movement leftward as the elements in the line are successively displaced upwardly along the feed channel 40a, all in the manner hereinbefore outlined. And it is during the successive advances of follower 18, in response to each removal of an element, and the corresponding advances of roller 35 along the inclined rail 31 that the measured amount of shortage D is distributed by increments among the successively photographed letters and word spaces to effect justification.

Further as already outlined, after removal of the last element from the line the cam shaft 65 is started again and the various elements of the machine are returned to their initial positions while the line of elements discharged from the feed channel 40a and accumulated on the elevator bar 63 are returned to their places of storage in the magazine 1.

As seen by comparing the spacer element in Figs. 2 and 3 with that shown in Fig. 18, the depending wedge member of the latter is devoid of the slot 69 by which the former element attains the "friction" feature as already explained. Instead, the depending wedge 68a of the element in Fig. 18 has a free sliding fit in the dovetail grooves of the upper or stationary wedge member 66a. Such free sliding construction is entirely suitable for the automatic spacer adjusting arrangement for reasons already explained, but it will be understood that the "friction" construction may also be used, if desired, in which case the additional locking bolt 96 for the driver 84 may be dispensed with.

There remains to be explained the arrangement illustrated in Figs. 3, 4, 5 and 6 for depressing the wedge members of the friction type of spacer prior to discharge of such spaces from the feed channel 40a onto the second elevator bar 63. As indicated, the spacers (and the character elements as well) are elevated to the discharge position by the upper set of feed pawls 61 which engage the underside of the lower lugs on the sleeve member 66, or the corresponding lugs on the character elements.

In Fig. 4, the depending wedge of the spacer shown in the course of elevation is in the particular "up" position it happened to have been driven by the driver 72, for example. In such "up" position the top edge of the wedge of course projects across or overlies the V-shaped notch in the stationary member 66. Accordingly, as pawls 61 elevate the spacer to its full height squarely in front of the pusher 62, the top edge of the upward projecting wedge member encounters a blade 102 fixed to a V-shaped block 103, the latter being secured to the stationary feed channel plate 104. As evident, blade 102 thus serves to depress the upward projecting wedges of each spacer during the latter part of its elevation by pawls 61, and the moment a spacer reaches it full elvation the pusher 62, reciprocating in timed relation to the movement of the lifting pawls, moves it laterally onto the ribbed elevator bar 63 where it is sustained by the teeth 67 in the sleeve member. Fig. 6 shows a spacer so discharged by pusher 62 and hanging on the bar 63.

After all of the character and spacer elements of a given line have been discharged onto bar 63 the latter is moved upwardly to distributing devices provided on the machine, not here shown but of well known construction, whereby they are returned to the storage magazine 1. Fig. 13 illustrates the manner in which the spacer elements are disposed if carried in storage channels of a standard form of magazine, it being noted that the sleeve members of the successive elements in the stored column thereof abut while the depending wedges nest in the V-shaped notches of the sleeves.

From the foregoing it will be seen that according to the invention there is provided in connection with producing justified lines of type matter from composed lines of character and word-space elements, primary means for adjusting the length of the composed line of elements by distributing a limited portion of the line shortage only among the word spaces to be produced, and secondary means for adjusting the length of the composed line by distribution the remaining portion of the line shortage among the characters as well as the word spaces produced in amounts for each character and word space determined by the setwise width of the element from which it is reproduced.

Since many possible embodiments may be made of the above invention to adapt it to typographical machines of different forms, and since many changes may be made in the embodiment herein set forth, all within the spirit of the invention, it is to be understood that all matter herein described or shown is to be interpreted as illustrative and not in a limiting sense.

I claim:

1. Apparatus for producing a line of type matter of a desired length from elements composed into a line of an arbitrary shorter length and containing word-space representing elements expansible in thickness and elements of fixed variant thicknesses representing the variant width type characters to be produced, in combination; a channel for supporting the composed line of elements, means for expanding the word-space elements in said line and accordingly increasing its length; stop means providing a maximum limit short of the desired line-length to which the length of said line of elements may be increased by said expansion and means for holding the word-space elements in their expanded condition; a line-shortage gauge and operating means for moving it from an inactive position to an active position between said stop means and the terminal end of the line to provide a gauge of the difference between the expanded and desired line-lengths; means for locking the gauge operating means in its operated position; and means for progressively re-producing in line the characters and word-spaces represented by the composed line of elements, said re-producing means including responsive means for progressively advancing the line of elements and said gauge relatively to the gauge operating means and advanceable in response to the thicknesses of the successive elements, and means operable under control of the gauge operating means to cause progressive retreat of the gauge from its active position extents governed by and proportionate to the extent of its advances as determined by the thicknesses of the successive elements, said responsive means operating in accordance with such retreat of the gauge to distribute the gauged amount of line-length difference among the characters and word spaces produced in an amount for each character and word-space element proportionate to its thickness.

2. The combination set forth in claim 1, wherein the expansible word-space elements are provided with self-contained means adapted to hold them in their expanded condition.

3. The combination set forth in claim 1, including a lock for the word-space expanding means and power driven means for operating said expanding means and thereafter said lock to hold the expanding means in its operated position and by it the word-space elements in their expanded condition.

4. The combination set forth in claim 1, wherein the word-space elements operate to stop the movement of the expanding means when sufficient in number and expansive capacity to increase the line to the maximum length determined by the stop means specified, an additional stop independent of the word-space elements being provided for stopping said expanding means when expansion of said elements fails to increase the length of the line to said maximum length.

5. Apparatus for producing a line of type matter justified to a desired length from elements composed into a line of an arbitrary shorter length, said composed line containing word-space elements expansible in thickness and character-bearing elements having fixed thickness dimensions proportionate to the variant setwise widths of the characters borne by the respective elements, in combination; a channel having an effective length equal to the justified line-length to be produced and adapted to support a composed line of elements for measurement of its length as determined by the aggregate of the thicknesses of the elements; power operated means for expanding the word-space elements and accordingly the length of the composed line of elements in said channel; means including the word-space elements for limiting the operation of said expanding means upon expansion of the line to a predetermined maximum length short of the length of said channel, the number and the expansive capacity of the word-space elements determining the actual extent by which the length of the line may be increased; locking means for holding said expanding means in its operated position and by it the word-space elements in expanded condition; line measuring means including a gauging member and an actuating member for moving it endwise against the line of elements from a position in said channel corresponding to the justified line-length, said members in their relative operated positions providing a gauge of the total difference between the expanded and the justified line-lengths; means for locking said actuating member in its actuated position relative to said gauging member; reproducing means for progressively producing in a line the characters and word-spaces of the successive elements in justified spaced relation including a line advancing member operatively connected to said gauging member and movable relatively thereto under control of said locked actuating member as the line of elements is advanced, and responsive means operating to move said line advancing member progressively in response to the thickness dimensions of the successive elements, the extent of the relative movement between said gauging and line advancing members operating to determine the extent of said responsive movements and accordingly the relative setwise spacing of the characters and words in the line of type matter produced.

6. Apparatus for producing a line of type matter justified to a desired line measure from elements composed into a line short of said measure, said composed line containing word-space elements expansible in thickness and character-bearing elements having fixed thickness dimensions representing the variant setwise widths of the characters borne by the respective elements, in combination; a line composing channel having a maximum length less than the justified line measure to be produced, manually movable means for expanding the word-space elements and accordingly the length of the composed line of elements to an arbitrary length equal to or less than the length of the channel according to number and expansive capacity of the word-space elements in the line; stop means limiting the movement of said expanding means in the event that the expansive capacity of the word-space elements is insufficient to expand the line to the length of said channel and means self contained on the word-space elements for holding them in expanded condition; a line-measuring channel and delivery means for delivering the expanded line of elements thereinto from the line composing channel; gauging means including a line compacting member movable endwise against the line of elements from a position in said measuring channel corresponding to the justified line measure and providing by the extent of its movement in compacting the line a gauge of the remaining difference between its expanded length and the justified line measure; reproducing means for progressively producing in line the characters and word spaces of the successive elements including a line advancing member operatively connected to said line compacting member and relative to which the latter member is adapted to move under control of said gauging means as the line of elements is advanced, and means operating to cause said line advancing member to advance progressively in response to the thickness dimensions of the successive character and expanded word-space elements, the extent of relative movement between said line compacting and line advancing members upon each advance of the latter member operating to augment the setwise spacing of the successive characters and word-spaces produced by portions of the gauged amount of said remaining line-length difference proportionate to the variant thickness dimensions of the respective elements.

7. Apparatus for producing a line of type matter justified to a desired length from elements composed into a line of an arbitrary shorter length, said composed line containing word-space elements expansible in thickness and character-bearing elements having thickness dimensions representing the variant setwise widths of the characters borne thereby, in combination; a line composing channel of a length less than the desired justified line-length by a fixed amount and a line-length indicator disposed for movement by and as the line of elements is composed in said channel; means for expanding the word-space elements and accordingly the length of the composed line of elements to the extent that the indicated shortage of the line is within a predetermined maximum amount short of the length of said channel; a line-measuring channel of an effective length equal to the desired justified line-length and means for delivering thereto the expanded line of elements; line measuring means including a movable guaging member and an operating member for moving it into the space remaining between the end of the delivered line of elements and the adjacent end of said line measuring channel, said members in their relative operated positions providing a gauge of the remaining amount of shortage in said line; means for locking said operating member in its operated position; and reproducing means including said gauging member and responsive means for progressively producing in justified spaced relation the successive characters and word-spaces of the elements in the measured line thereof, said responsive means operating in response to the thickness dimensions of the successive elements to correspondingly advance the line of elements and concurrently to move said gauging member relatively to its locked operating member and the extent of such relative movement operating to alter the extent of each advance of the line by a portion of the gauged amount of the remaining line-shortage proportionate to the thickness of the particular character or word-space element.

8. The combination set forth in claim 7, wherein the expansible word-space elements are provided with self-contained friction means for holding them in any expanded condition.

9. Apparatus for producing a line of type matter justified to a desired length from elements composed into a line of shorter length containing word-space elements expansible in thickness and character-bearing elements of fixed variant thicknesses in accordance with the variant setwise widths of the characters borne thereby, in combination, a channel for supporting a composed line of such elements, means including limiting means for expanding the word-space elements and accordingly the length of said line of elements to an arbitrary length less than the justified line-length to be produced; means for holding said word-space elements in expanded condition; gauging means cooperative with the line of elements and operative to gauge the difference between the expanded and the justified line-lengths as determined by the aggregate of the thicknesses of the elements in the expanded line thereof; producing means for progressively producing in line the characters and word spaces represented by the successive elements including a responsive member for progressively advancing the line of elements and responsive to the variant thicknesses of the successive elements as it so advances the line, and means operating as the line is advanced to cause said gauging means to move relative to said line extents determined by the said variant thicknesses of the elements and thereby to augment the extent of the responsive movements of said responsive member and accordingly the length of the line of type matter produced by the gauge amount of line-length difference.

10. Apparatus for producing a line of type matter justified to a desired length by distributing the amount by which a composed line of elements representing the characters and word-spaces to be produced is short of such length among the characters and word spaces represented by said elements, comprising a composed line containing word-space elements expansible in thickness and elements having fixed thickness dimensions which differ according to the variant widths of the characters represented by the respective elements, means including limiting means for expanding the word-space elements and correspondingly the line of elements to distribute equally among the word-spaces to be produced a limited portion only of the line-shortage, gauging means cooperative with the expanded line of elements to the extent of the remaining amount of the line-shortage and operating means for said gauging means, and reproducing mechanism comprising a responsive member for progressively advancing the line of elements and adapted to respond to the thickness dimensions of the successive elements in so advancing the line, and means operating to cause said gauging means to move said responsive member relatively to the line upon each line advancing action, the extent of such relative movement operating to alter the extent of the advancing movements of said responsive member in varying amounts determined by the thickness dimensions of the respective elements and thereby to distribute among the characters as well as the word spaces produced the gauged amount of the remaining line-shortage.

11. Apparatus for producing a line of type matter justified to a desired length by distributing the amount by which a composed line of character and word-space representing elements from which to produce the line is short of such length among the characters and word spaces produced, in combination, a composed line containing word-space elements expansible in thickness and elements having fixed thickness dimensions which differ according to the variant widths of the characters they represent, means including limiting means for expanding the word-space elements to distribute among the word spaces to be produced an arbitrary and limited portion only of the line-shortage, a gauge movable into cooperative relation with the line of elements against the urge of a spring and operative to gauge the remaining amount of the line-shortage as determined by the aggregate of the thicknesses of the character and expanded word-space elements, operating means for said gauge and a lock for locking said operating means in its operated position relative to the gauge, and producing mechanism including a responsive member for progressively advancing the gauge and by it the line of elements relative to said locked gauge operating means and responsive to the thickness dimensions of the successive elements while so advancing the line, the gauge operating means and the spring for said gauge operating to cause the gauge upon each advance of the line to move relatively to said responsive member an amount determined by the thickness dimension of the element to which said member responds and such relative movement of the gauge operating to distribute among the characters and word spaces throughout the line of type matter produced the gauged amount of the remaining line-shortage.

12. Apparatus for producing a line of type matter of a desired justified length by distributing among the characters and word spaces in the line to be produced the amount by which a composed line of elements representing the respective characters and word-spaces and their variant setwise widths is short of such length, the word-space elements being expansible in width, in combination, primary line-length adjusting means including limiting means for expanding the word-space elements to an extent to distribute among the word spaces to be produced a portion only of the line-shortage, secondary line-length adjusting means including a stop defining the terminal end of a line of the justified length desired and a tapered gauge, actuating means for moving said gauge laterally into the space between the end of the line of elements and said stop and providing by the extent of such movement a gauge of the amount of the remaining line-shortage, a lock for locking said actuating means in its actuated position, and producing means operative under control of said secondary adjusting means to progressively reproduce in line the characters and word spaces represented by said line of elements, said producing means including a reproducing position and responsive means for progressively advancing said stop and by it said gauge and the line of elements to present the successive elements at said reproducing position, means acting on the gauge and operating under control of the gauge actuating means as the gauge is advanced to progressively withdraw the gauge, and means operable to cause said responsive member to respond concurrently to such withdrawal of the gauge and to the width representations of the successive elements, thereby to alter the extent of the successive line advancing actions of said member in amounts required to distribute the total gauged amount of line-shortage among the characters as well as the word spaces throughout the line of type matter produced.

13. Apparatus for producing a line of type matter of a desired justified length by distributing the amount by which a composed line of character and word space representing elements from which to produce the line is short of such length among the characters and word spaces produced, in combination, a composed line containing word-space elements expansible in width and character-bearing elements of fixed variant widths according to the setwise widths of their respective characters, primary line-shortage distributing means including limiting means for expanding the word-space elements to an extent to distribute a limited portion of the line shortage among the word spaces to be produced, secondary line-shortage distributing means including a stop defining the terminal end of a line of the desired justified length, a cooperative gauge and operating means for moving said gauge away from said stop to compact the line of elements endwise and by the extent of such movement to provide a gauge of the remaining amount of line-shortage, and producing means operative under control of said secondary line-shortage distributing means to progressively produce the line of type matter represented by said line of elements, said producing means including a responsive member for progressively advancing said stop and by it said gauge and the line of elements and responsive to the widths of the successive elements while so advancing, and means including the gauge operating means operating to cause the gauge to progressively retreat toward the stop and the successive advances of said responsive member to correspondingly increase to the extent required to distribute the gauged amount of line-shortage among the characters as well as the word spaces throughout the line of type matter produced.

14. Apparatus for effecting line justification in the production of a line of type matter from a composed line of character-bearing elements of fixed variant widths and word-spaced elements which are expansible in width, in combination, opposed line-end stops spaced in accordance with the justified line-length and means for supporting between said stops a composed line of elements which is short of said length, means including limiting means for expanding the word-space elements and accordingly the length of the line of elements to an extent to distribute among the word-space elements a portion only of the line shortage, means for measuring the remaining amount of the line shortage as determined by the space remaining between the end of the expanded line of elements and the adjacent line-end stop and operating means for said measuring means, producing means including responsive means operable in response to the widths of the successive elements to progressively produce the line of type matter from said line of elements, and justifying means including a member operating under control of said measuring means to cause said responsive means to respond to extents sufficiently greater than the widths of the respective elements to distribute the remaining amount of the line shortage among the characters as well as the word spaces throughout said line of type matter produced.

15. Apparatus for effecting line justification in the production of a line of type matter from a composed line of character-bearing elements of fixed variant widths and word-space elements which are expansible in width, in combination, opposed line-end stops spaced in accordance with the justified line-length and means for supporting between said stops a composed line of elements which is short of said length, means including limiting means for expanding the word-space elements and accordingly the length of the line of elements to an extent to distribute among the word-space elements a portion only of the line shortage, means for measuring the remaining amount of the line shortage as determined by the space remaining between the end of the expanded line of elements and the adjacent line-end stop and operating means for said measuring means, producing means movable under control of the widths of the respective elements to progressively produce the line of type matter, and justifying means including a member for moving said producing means under control jointly of said measuring means and its operating means and operable to distribute the remaining amount of the line shortage among the characters and word spaces produced in portions governed by the widths of the respective elements.

16. Apparatus for effecting line justification in the production of a line of type matter from a composed line of character-bearing elements of variant widths according to the widths of the characters borne thereby and word-space elements which are expansible in width, in combination, opposed line-end stops spaced in accordance with the justified line-length and means for supporting between said stops a composed line of elements which is short of said length, means including limiting means for expanding the word-space elements and accordingly the length of the line of elements to distribute among said elements a portion only of the line-shortage, a line-shortage gauge cooperative with the terminal line-end stop, operating means for moving said gauge to the extent of the remaining line shortage as determined by the space remaining between said stop and the end of the expanded line of elements and means for locking said operating means in its operated position relative to the gauge, producing means operable under control of the widths of the respective elements to progressively produce the line of type matter, and justifying means including said gauge and a member for progressively moving it and the producing means under control of the gauge operating means and operable to effect distribution of the remaining amount of the line shortage among the characters and word spaces throughout the line of type matter produced in amounts determined by the variant widths of the respective elements.

17. Apparatus for producing a line of type matter of a desired justified length by distributing among individual elements representing the characters and word-spaces to be produced and their setwise widths, the amount by which a line of such elements composed setwise is short of such length, the word-space elements being expansible in width, comprising in combination; means at a first station operable upon the expansible word-space elements to primarily expand the composed line of elements to a preselected limit short of the desired justified line-length, and justifying and reproducing means at a second station operable upon said primarily expanded line of elements to justify and reproduce the same; said first-station means including an actuator operable upon all the expansible word-space elements simultaneously to equally expand the same and thereby distribute a portion of the line-shortage only among said elements, a limiting stop adjusted to a preselected length of line short of the desired justified length of line and up to which stop the line of elements may be expanded in absorbing such portion of the line-shortage; means to maintain the word-space elements in their expanded position; and means for passing the primarily expanded line of elements from the first station to the second station, said justifying means at the second station including means to measure the still remaining shortage of line-length; and means cooperative with said measuring means for distributing the measured shortage among the character and word-space elements throughout the line thereof to cause said reproducing means to reproduce from the line of elements a line of the justified length desired.

18. Apparatus for producing a line of type matter of a desired justified length by distributing among individual elements representing the characters and word-spaces to be produced and their variant setwise widths, the amount by which a line of such elements composed setwise is short of such length, the word-space elements being expansible in width, comprising in combination; means at a first station operable upon the expansible word-space elements to primarily expand the composed line of elements to a preselected limit short of the desired justified line-length, and justifying and reproducing means at a second station operable upon said primarily expanded line of elements to justify and reproduce the same; said first-station means including an actuator operable upon the expansible word-space elements to expand the same and thereby distribute a portion of the line-shortage only among said elements, a limiting stop adjusted to a preselected length of line short of the desired justified length of line to limit the amount of line-shortage that may be absorbed by expansion of the word-space elements; means to maintain the word-space elements in their expanded position; and means for passing the primarily expanded line of elements from the first station to the second station, said justifying means at the second station including measuring means movable to an extent determined by the still remaining amount of line-shortage, and said justifying and reproducing means operating conjointly under control of said measuring means in its moved position and the widths of the respective elements to distribute the measured amount of shortage among said elements in varying amounts according to the setwise widths of the respective elements whereby the line of type matter reproduced from said line of elements attains the desired length.

19. Apparatus for producing a line of type matter of a desired justified length by distributing among individual elements representing the characters and word spaces to be produced to form such line and their respective variant setwise widths, the amount by which a line of such elements composed setwise is short of such length, the word-space elements being expansible in width, comprising in combination, primary means operable to expand the word-space elements and arbitrarily increase the length of the composed line of elements in the space between limiting stops spaced apart according to a preselected measure short of the desired justified measure, means to maintain the line of elements in its expanded condition, gauging means for gauging the amount of measure still remaining short of the justified measure, secondary line-expanding means adapted for operation under control of said gauging means to distribute the gauged amount of measure among the character and the word-space representing elements to attain the desired justified measure, and means for reproducing the characters and word spaces represented by the respective elements to form the line of type matter.

20. Apparatus for producing a line of type matter of a desired justified length by distributing among individual elements representing the characters and word spaces to be produced to form such line and their respective setwise widths, the amount by which a line of such elements composed setwise is short of such length, the word-space elements being expansible in width, comprising in combination, primary means operable to expand the word-space elements and increase the length of the composed line of elements in the space between limiting stops spaced apart according to a preselected measure short of the desired justified measure, means to maintain the line of elements in its expanded condition, movable gauging means providing in its moved position a gauge of the amount of measure still remaining short of the justified measure, secondary line-expanding means adapted for operation under control of said gauging means to distribute a portion of the gauged amount of measure to each character and the word-space representing element to thereby attain the desired justified measure, and means for reproducing the characters and spaces of the respective elements in the spaced relation determined by and concurrently with such distribution of the gauged amount of measure, to form the justified line of type matter.

21. Apparatus according to the combination set forth in claim 17, wherein said first station is the assembling station at which location the character and word-space elements are composed in setwise line formation, and the second station is the location at which the composed and primarily expanded line of elements is justified and reproduced to form the justified line of type matter.

22. The method of producing a line of type matter of a desired justified length, comprising the steps of; establishing a selected length of line short of the justified length and up to which selected length a composed line of elements from which to produce the line of type matter is primarily expanded at a first station by means of expansible word-space elements, maintaining said composed line of elements at said selected length during passage thereof from the first station to a second station, and at said second station distributing the remaining amount of line shortage, to attain the desired justified length, among the word spaces and the characters produced while maintaining the word-space elements and by them the line of elements expanded.

23. Apparatus for producing a line of type matter of a desired justified length by distributing among character-bearing elements of fixed setwise widths and word-space elements expansible in setwise width, the amount by which a line of such elements composed setwise is short of such length, comprising in combination, means at a first station operable upon the expansible word-space elements to primarily expand the composed line of elements to a preselected limit short of the desired justified line-length, and justifying and reproducing means at a second station operable upon said primarily expanded line of elements to justify and reproduce the same, said first station means including an actuator operable upon the expansible word-space elements to expand the same and thereby distribute a portion of the line-shortage among said elements, stop means defining a length of line shorter by a fixed amount than the desired justified length of line and disposed to limit the amount of line-shortage that may be absorbed by expansion of the word-space elements, means to maintain the word-space elements in their expanded position, and means for passing the primarily expanded line of elements from the first station to the second station, said justifying means at the second station including measuring means movable against the expanded line of elements and providing in its moved position a gauge of the still remaining amount of line-shortage, and means including said reproducing means cooperative with said measuring means for distributing the gauged amount of line-shortage among the character and the expanded word-space elements throughout the composed line thereof and producing therefrom a line of the justified length desired.

HERMAN R. FREUND.